US009804817B2

(12) United States Patent
Hutchings et al.

(10) Patent No.: US 9,804,817 B2
(45) Date of Patent: Oct. 31, 2017

(54) APPARATUS AND METHOD FOR AUTOMATIC DEVICE SELECTION FOR WIRELESS MEDIA DEVICES

(71) Applicant: Harman International Industries, Inc., Stamford, CT (US)

(72) Inventors: Jeffrey L. Hutchings, Lehi, UT (US); Richard Kreifeldt, South Jordan, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 6 days.

(21) Appl. No.: 14/588,578

(22) Filed: Jan. 2, 2015

(65) Prior Publication Data

US 2015/0193198 A1 Jul. 9, 2015

Related U.S. Application Data

(60) Provisional application No. 61/924,012, filed on Jan. 6, 2014.

(51) Int. Cl.
*G06F 17/00* (2006.01)
*G06F 3/16* (2006.01)
(Continued)

(52) U.S. Cl.
CPC ....... *G06F 3/165* (2013.01); *H04N 21/42203* (2013.01); *H04N 21/4394* (2013.01);
(Continued)

(58) Field of Classification Search
CPC .............................................. H04R 2227/005
See application file for complete search history.

(56) References Cited

U.S. PATENT DOCUMENTS

2002/0169539 A1 11/2002 Menard et al.
2003/0119523 A1 6/2003 Bulthuis
(Continued)

FOREIGN PATENT DOCUMENTS

WO 02073562 A1 9/2002
WO 2008011384 A1 1/2008

OTHER PUBLICATIONS

European Search Report for corresponding Application No. 15150003.0, dated May 13, 2015, 11 pages.
(Continued)

*Primary Examiner* — Thomas Maung
(74) *Attorney, Agent, or Firm* — Brooks Kushman P.C.

(57) ABSTRACT

In at least one embodiment, an apparatus for automatic device selection and for media content playback is provided. The apparatus includes a first media device positioned in a first media zone and being wirelessly coupled to a second media device that is positioned in a second media zone and a mobile device that transmits media content. The first media device is configured to receive a first signal from the second media device to determine a first distance of the second media device from the first media device and to receive a second signal from the mobile device to determine a second distance of the mobile device from the first media device. The first media device is further configured to playback the media content from the mobile device in the first media zone if the second distance is less than the first distance.

15 Claims, 7 Drawing Sheets

(51) Int. Cl.
*H04N 21/422* (2011.01)
*H04N 21/439* (2011.01)
*H04W 4/00* (2009.01)
*H04N 21/436* (2011.01)

(52) U.S. Cl.
CPC ...... *H04N 21/43615* (2013.01); *H04W 4/005* (2013.01); *H04R 2227/005* (2013.01)

(56) References Cited

U.S. PATENT DOCUMENTS

| | | | |
|---|---|---|---|
| 2008/0025535 A1* | 1/2008 | Rajapakse | H04L 65/605 |
| | | | 381/311 |
| 2009/0232481 A1 | 9/2009 | Baalbergen et al. | |
| 2014/0046464 A1* | 2/2014 | Reimann | H04R 27/00 |
| | | | 700/94 |
| 2014/0273859 A1* | 9/2014 | Luna | H04W 4/008 |
| | | | 455/41.3 |

OTHER PUBLICATIONS

European Office Action for Application No. 15 150 003.0-1905, dated Mar. 31, 2017, 9 pages.

* cited by examiner

APPARATUS AND METHOD FOR AUTOMATIC DEVICE SELECTION FOR WIRELESS MEDIA DEVICES

CROSS-REFERENCE TO RELATED APPLICATIONS

This application claims the benefit of U.S. provisional application Ser. No. 61/924,012 filed Jan. 6, 2014, the disclosure of which is hereby incorporated in its entirety by reference herein.

TECHNICAL FIELD

Embodiments disclosed herein generally relate to an apparatus and method for automatic device selection for wireless media devices and for automatic playback of media content.

BACKGROUND

Multiple wireless media devices (e.g., loudspeakers and the like) positioned in the same building while paired to a mobile device may cause conflicts regarding which media device to select for media play out. Device names are generally identical for identical models (e.g., loudspeakers and mobile devices) and cannot be changed by the user. Moreover, devices are usually in separate rooms, and are obstructed by walls thereby causing determination of a wrongly selected device difficult. Once a mobile device is paired with such media devices, they may be present in a device selection list with identical names. This condition may make it difficult to ascertain which wireless mobile device is the one that is actually in a particular room. The embodiments disclosed herein may automatically resolve such an issue and others as noted below.

SUMMARY

In at least one embodiment, an apparatus for automatic device selection and for media content playback is provided. The apparatus includes a first media device positioned in a first media zone and being wirelessly coupled to a second media device that is positioned in a second media zone and a mobile device that transmits media content. The first media device is configured to receive a first signal from the second media device to determine a first distance of the second media device from the first media device and to receive a second signal from the mobile device to determine a second distance of the mobile device from the first media device. The first media device is further configured to playback the media content from the mobile device in the first media zone if the second distance is less than the first distance.

In at least another embodiment, a method for automatic device selection and for media content playback is provided. The method includes wirelessly coupling a first media device to a second media device and to a mobile device that transmits media content and determining a first distance between the first media device and the second media device in response to first signal as transmitted from the second media device. The method further includes determining a second distance between the first media device and the mobile device in response to a second signal as transmitted from the mobile device and selecting the first media device to playback the media content from the mobile device in the first media zone if the second distance is less than the first distance.

In at least another embodiment, an apparatus for automatic device selection and for media content playback. The apparatus includes a mobile device for being wirelessly coupled to a first media device that receives a first signal from a second media device to determine a first distance between the first media device and the second media device. The mobile device is configured to transmit a second signal to the first media device to determine a second distance between the mobile device and the first media device and to transmit media content for playback on the first media device if the first distance is greater than the second distance.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

Figure 1:
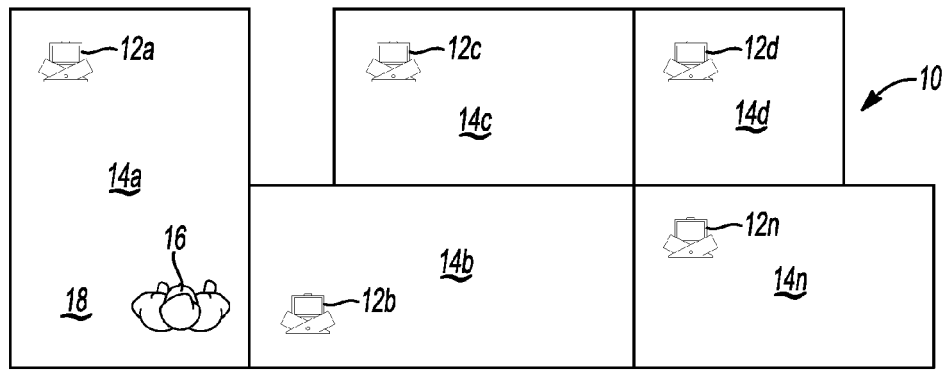
FIG. 1 depicts a building including multiple media devices in separate rooms.

FIG. 1 depicts a building 10 including multiple media devices 12a-12n ("12") in separate rooms 14a-14n ("14"). Each media device 12 may be a loudspeaker or other suitable device. Hereafter, element 12 may be referred to as either the media device or the loudspeaker. A user 16 carries a mobile device 18 throughout the rooms 14. The loudspeaker 12 is configured to wirelessly communicate with the mobile device 18 while carried by the user 16. The mobile device 18 may be any portable device that stores media, such as a laptop computer, cellphone, tablet computer, etc. In one example, media associated with the mobile device 18 may be stored remotely (e.g., in a "cloud") and accessed by the mobile device 18. Additionally, the loudspeaker 12 may include a battery (not shown) and may be portable or generally fixed within the room 14. It is recognized that the media device 12 may also be a television, a home theatre system or a video terminal or any other device that is situated to transmit audio and/or video data (hereafter "entertainment data").

In general, the mobile device 18 is configured to select a corresponding media device 12 to transmit the entertainment data in a corresponding room 14. For example, as the user 16 enters into room 14a, the mobile device 18 is generally arranged to identify and select the loudspeaker 12a to transmit the entertainment data. As the user 16 strolls through the building 10 and enters the room 14b, the mobile device 18 is configured to deactivate the loudspeaker 12a and to activate the loudspeaker 12b for transmitting the entertainment data in the room 14b to the user 16. This pattern repeats itself as the user 16 moves about the various rooms 14 within the building 10 while carrying the mobile device 18.

It is recognized that for the foregoing process to execute as described, the user 16 may be required to pair his/her mobile device 18 to each media device 12 once. However, in this case, two or more of the various media devices 12 in the various rooms 14 may be similar to one another. For example, the loudspeaker 12a in the room 14a may be similar to the loudspeaker 12b in the room 14b. Thus, the mobile device 18 when paired to the loudspeakers 12a and 12b may store the same device name (or other data which is the same) for such loudspeakers 12a and 12b. In this case, the mobile device 18 may select the incorrect loudspeaker 12a or 12b. For example, assume the user 16 reenters the room 14a from the room 14b. In this case, the mobile device 18 may keep the loudspeaker 12b in the room 14b active while the user 16 is in the room 14a. In addition, assume the user 16 enters into the room 14d, the mobile device 18 may activate the loudspeaker 12c to transmit the entertainment data and not activate the loudspeaker 12d if the loudspeakers 12c and 12d share similar identification data. In this case, the user 16 may hear the loudspeaker 12c transmitting the entertainment data in the room 14c while he/she is actually located in the room 14d or may not simply hear the entertainment data altogether.

Figure 2:
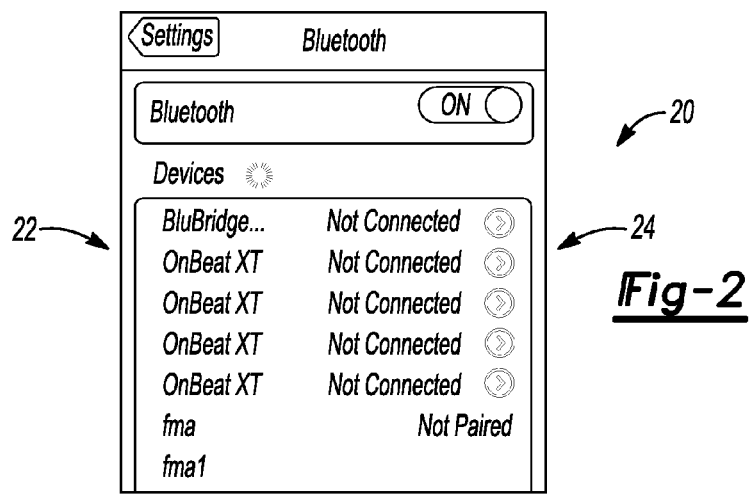
FIG. 2 depicts a listing of media devices stored in a mobile device in accordance to one embodiment.

FIG. 2 generally illustrates a listing of Bluetooth® devices that are stored in a look up table (LUT) 20 within the mobile device 18. Such Bluetooth® devices may be the media devices 12. The various media devices 12 are stored within the LUT 20 with a corresponding device name 22 (e.g., BluBridg . . . , OnBeat XT). A status 24 for each device name 22 (e.g., connected or not connected) is shown in the LUT 20. As shown, similar device names 22 are provided for a number of media devices 12. Thus, the user 16 of the mobile device 18 may not know which device name 22 to establish a connection with for a particular room 14. The implementation as set forth below in connection with FIG. 3 alleviates the condition where similar device names 22 are used for similar media devices 12. In addition, the implementation as set forth below in connection with FIG. 3 may also be used to resolve conflicts when two or more media device 12 are detected to be proximate to the mobile device 18 and the mobile device 18 plays back the media content with the incorrect media device 12. The aspect will be discussed in more detail in connection with FIG. 8.

Figure 3:
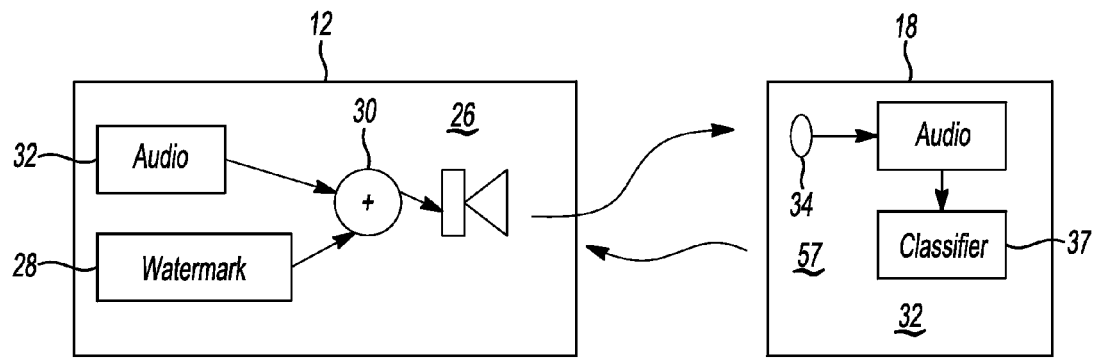
FIG. 3 generally illustrates that the media device wirelessly transmits information to the mobile device such that the mobile device learns the identity of the media device for a particular room.

FIG. 3 generally illustrates the media device 12 (e.g., wireless loudspeaker) for wirelessly transmitting information to the mobile device 18 such that the mobile device 18 learns the identity of the media device 12 for a particular room 14. For example, the loudspeaker 12 may include a microcontroller 26 for providing an audio watermark 28 that includes an inaudible signature. An adder 30 may combine the inaudible signature onto an audio signal 32 to generate a predetermined audio signal. The relevance of the predetermined audio signal will be described in more detail below.

Upon the mobile device 18 establishing a connection with the loudspeaker 12 (e.g., mobile device 18 selects the loudspeaker 12 to establish a wireless connection therewith via Bluetooth® or other suitable protocol (while not shown, it is recognized that the media device 12 and the mobile device 18 may each have a transceiver for enabling bi-directional communication with a suitable protocol)), the loudspeaker 12 embeds the inaudible signature onto the audio signal 32 which is then transmitted to the mobile device 18. Alternatively, the audio watermark 28 may include an audible preamble tone that is placed on the audio signal 32. The audible preamble tone that is placed on the audio signal 32 may also be defined as the predetermined audio signal. The loudspeaker 12 then transmits the predetermined audio signal to the mobile device 18 after a connection is established between the loudspeaker 12 and the mobile device 18 just prior to the loudspeaker 12 playing back the audio signal to determine if there is a match to data stored in the mobile device 18.

The mobile device 18 includes memory 57 for storing either the inaudible signature or the audible preamble that is previously stored thereto during a pairing operation. The mobile device 18 further includes an internal microphone 34 (or other receiver) for receiving the predetermined audio signal (i.e., the mobile device 18 may actively sample data on the predetermined audio signal). The mobile device 18 includes a classifier 37 for classifying the inaudible signature or the audible preamble. In other words, the classifier 37 compares the inaudible signature or the audible preamble as provided on the predetermined audio signal to the stored inaudible signature or to the stored audible preamble, respectively, to determine if there is a match.

If the inaudible signature or the audible preamble match the stored inaudible signature or the stored audible preamble, respectively, then the mobile device 18 begins sourcing audio to loudspeaker 12 such that the loudspeaker 12 plays back the audio data to the user 16. If not, then the mobile device 18 may select the next closest loudspeaker 12 as determined via radio signal proximity as disclosed in U.S. Provisional Application No. 61/923,936 ("the '936 application"), filed on Jan. 6, 2014, which is hereby incorporated by reference in its entirety. In another embodiment, the user 16 may instruct the mobile device 18 to select the next closest loudspeaker 12. If a match is not found, then the mobile device 18 may select or be instructed to select the next loudspeaker 12 as included in the LUT 20 and attempt to establish a connection for the purpose of receiving the predetermined audio signal from the same to determine if there is a match and so on. This process may repeat itself until a match is found or each of the loudspeakers 12 are checked to determine if the match is found. It is recognized that the above process is symmetrical and that the mobile device 18 may be the source for transmitting the predetermined audio signal and the loudspeaker 12 may perform the classification (or comparison). As noted above, the process may also be employed in the event the media devices 12 detect multiple media devices 12 in proximity to the mobile device 18 which causes an overlap condition. This will be discussed in more detail below.

Intelligent media and information zones (e.g., media zones) generally include the rooms 14 within an establishment (e.g., building or home) that have the media devices 12 (e.g., wireless speakers, docking stations, video terminals, home theater systems, etc.) linked with an intelligent connectivity network that enables a user's media content to be delivered automatically to each room 14 as the user 16 moves from room to room (or vehicle). A user's content is assumed to be stored on, or accessible from, the mobile device 18, such as the tablet or cellular phone.

In effect, the present disclosure provides, but not limited to, that the user's media "follows" the user throughout the rooms 14 (or even from the building 10 to a vehicle) thereby creating a new user experience. For example, imagine waking up in the morning and linking your mobile device 18 to a loudspeaker 12 such as an OnBeat Xtreme® to play music. Once dressed, the user 16 may place the mobile device 18 in his/her pocket and walk downstairs to the kitchen where another loudspeaker 12 (e.g., a JBL Soundfly®) is installed and ready for playback once the mobile device 18 and the loudspeaker 12 establish a connection with each other. For example, as the user 16 leaves his/her bedroom to walk downstairs towards the kitchen, the user 16 will hear the audio pause as the user 16 starts down the stairs to walk to the kitchen. As the user 16 enters the kitchen, the loudspeaker 12 therein begins seamlessly playing the audio right from where it paused. This can be extended to every room 14 of the home or into a vehicle as the user 16 leaves his/her home and enters into the vehicle.

There may be two use cases for media zones. The simplest case is a single media zone. In this case, the media zone comprises the entire room 14 in a building. Here, the media device 12 may initiate media content playback when the user 16 enters the room 14 with the mobile device 18 and pauses the media content playback when the user 16 exits the room 14. Areas outside of this single room 14 (e.g., media zone) are generally defined as inactive zones. Media content is either played locally from loudspeaker(s) and a screen (not shown) of the mobile device 18, or not played back when the user 16 (or the mobile device 18) is in an inactive zone.

The other use case includes multiple media zones. In this case, there may be multiple rooms 14 with each including at least one desired media device 12 to playback media content as the user 16 enters a particular room 14. The media zone is generally defined as a room including at least one desired media device 12 that is to playback media content when the mobile device 18 is present. The remaining rooms 14 which include the media device 12 are inactive since the user 16 (i.e., the mobile device 18) is not present in such rooms. For example, as the user 16 leaves a first media zone and enters a second media zone, the media (or audio) ceases to be played back in the first media zone and starts in the second media zone. In general, the media "follows" the user 16 from room to room (or media zone to media zone).

Embodiments disclosed herein may provide for a learning approach to map the media zones. Rather than to attempt to accurately initialize the media zone boundaries when the media device(s) 12 is installed, an apparatus as disclosed herein which learns and adapts various zone mappings over time based on an automatic input from the apparatus and/or manual input from the user 16. In general, manual mapping is not resilient and may be prone to errors. Moreover, it cannot react to changes in the location of the media delivery device.

The media devices 12, along with the mobile device 18, where possible, may communicate directly with one another to form a mesh network. Media zone locations, sizes, conflicts and resolutions may be stored on the media devices 12. This enables the media devices 12 and the mobile device 18 to exchange data with one another to notify the same which form a network of changes (e.g., media zone size or deletion). In general, the media devices 12 may each acquire various sensor fusion location parameters as described in the U.S. Provisional Application No. 61/923,857 ("the '857 application"), filed on Jan. 6, 2014 which is hereby incorporated by reference in its entirety and the '936 application. Such parameters may comprise distance between the media devices 12 and the mobile device 18, orientation of the mobile device 18, and movement of the mobile device 18. These parameters may be used to map an area in the building 10 to a specific media device 12 and the user 16. These parameters will be discussed in more detail in connection with FIG. 7. In addition, each media device 12a-12n may determine the signal strength for each signal received from another media device to ascertain the distance between the two media devices 12. The media device 12 uses such information to build a wireless fingerprint for each room 14. In addition, the mobile device 18 may receive this information and use the parameters along with the media devices 12 to provide a wireless finger print for each room 14. These aspects will be discussed in more detail in connection with FIG. 7.

Figure 4:
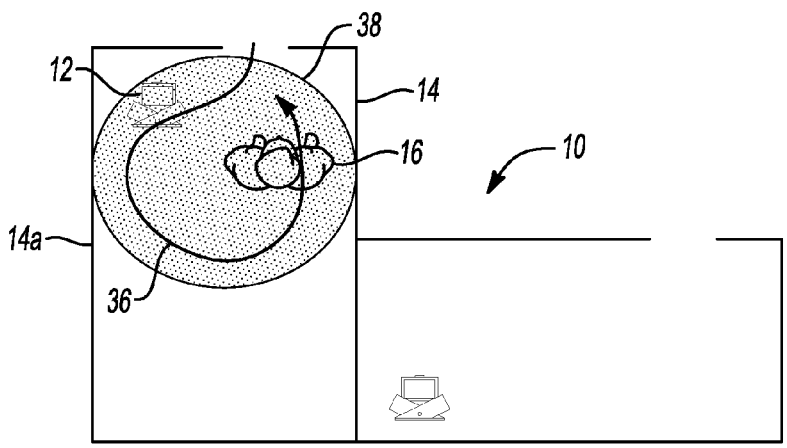
FIG. 4 depicts the condition in which the user enters the room for the first time after installing the media device.

FIG. 4 depicts the condition in which the user 16 enters the room 14a for the first time after installing the media device 12. Line 36 depicts the user's path through the room 14a. The region 38 indicates an initial media zone mapping as determined based on parameters and other information that are computed as the user 16 moves throughout the room 14a. When the user 16 (or the mobile device 18) is in the region 38, such region 38 indicates an initial media zone mapping as determined by parameters that are computed as the user 16 moves throughout the room 14a. When the user 16 is in the region 38, the media device 12 and the mobile device 18 electronically connect and share media content. In this case, the audio (or other media) is playing on the media device 12 as provided by the mobile device 18 being carried by the user 16.

Figure 5:
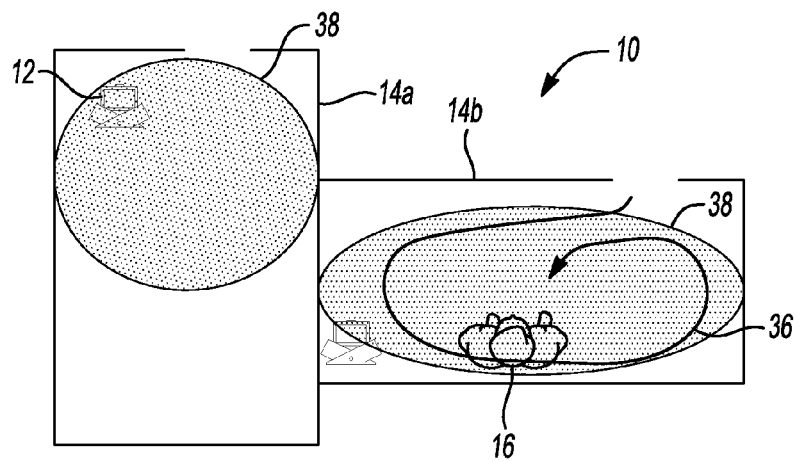
FIG. 5 depicts the condition in which the user has moved into a second room.

FIG. 5 depicts the condition in which the user 16 has moved into the second room 14b. In this case, the media device 12 stops playing when the user 16 is outside of the region 38 in the room 14a and begins playing when the user 16 is in the region 38 of the room 14b. Line 36 depicts the user's 16 path through the room 14b.

Due to the nature of using radio frequencies to track the location of the mobile device 18, it is possible that some areas may overlap because they have similar signal strength values to one another. In addition, it may be possible that in some cases, as the user 16 moves through the building 10 and the zone mappings are updated, that the media zone (e.g., region 38) in an adjacent room may appear to be closer or equidistant to the media zone (e.g., region 38) in the room 14 the user 16 currently occupies.

Figure 6:
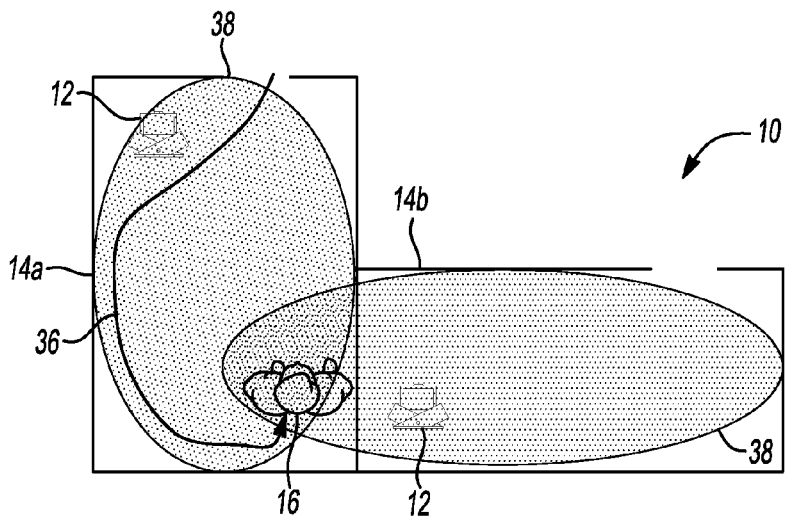
FIG. 6 generally depicts the condition in which an overlap is present between media devices in different rooms (or overlap of media zone)

FIG. 6 generally depicts the condition in which an overlap is present between media devices 12 in different rooms 14. For example, the user 16 has re-entered the room 14a and the media zone mapping is being updated as indicated by the path 36 as illustrated. However, the signal strength from the adjacent media device 12 in the room 14b is strong enough to indicate that the user 16 while positioned in the room 14a, is actually closer to the media device 12 in the room 14b. In this case, a wall in the building 10 separates the rooms 14a and 14b and the user's position with the media device 12 positioned in the room 14b is learned instead of the position of the media device 12 in the room 14a. This condition may need to be corrected.

Figure 7:
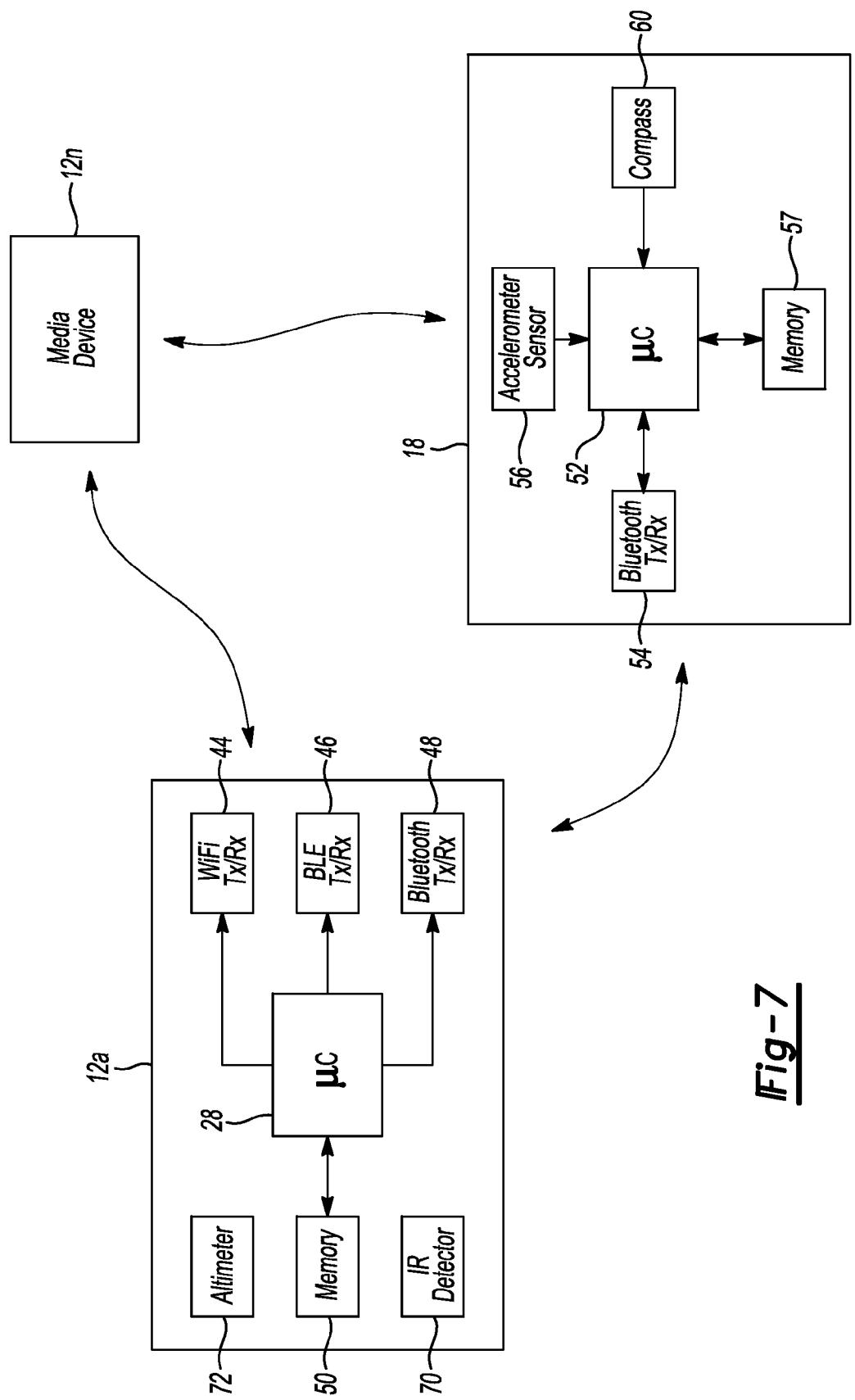
FIG. 7 depicts an apparatus for creating a media zone in accordance to one embodiment.

FIG. 7 depicts an apparatus 40 for creating a media zone in accordance to one embodiment. In general, the media devices 12a and 12n are configured to wirelessly communicate with one another, and the mobile device 18. For example, the media devices 12a or 12n may ascertain the signal strength for each received signal from the other media device 12a or 12n and the mobile device 18 in order to determine the distance from one another or to determine the distance of the media device 12 or to a main Wi-Fi access point. The media device 12a includes the microcontroller 26, a first transceiver 44 and a second transceiver 48. It is recognized the media device 12n as shown in FIG. 7 also includes all components as illustrated and described in connection with the media device 12a and that such components operate similarly for the media device 12n.

The first transceiver 44 is generally configured to enable communication via Wi-Fi with a basic wireless network that is positioned in the building 10. Thus, the media device 12a and the media device 12n may transmit beacon signals periodically to and from one another via Wi-Fi access points. Each media device 12a and 12n may determine the signal strength for each beacon signal received to then determine the distance between the two media devices 12a and 12n and the distance to the access points. Additionally, the second transceiver 48 of the media device 12a is generally configured to enable communication via BLUETOOTH LOW ENERGY ("BLE") and/or BLUETOOTH with the media device 12n. Thus, the media device 12a and the media device 12n may transmit beacon signals periodically to and from one another via BLE. Each media device 12a and 12n may determine the signal strength for each beacon signal received to then determine the distance between the two media devices 12a and 12n (i.e., to determine the location of the media device 12). The media device 12a further includes memory 50 for storing distance information (or the location of the media device 12n) based on the signal strength of the signal as received from the media device 12n.

The media devices 12a and 12n are configured to wirelessly communicate with the mobile device 18. The mobile device 18 includes a microcontroller 52 and a first transceiver 54 to enable communication with the media devices 12. The first transceiver 54 is generally configured to enable communication via BLE of Wi-Fi with the various media devices 12. One or more of the media devices 12 transmit a beacon signal to the mobile device 18. The mobile device 18 transmits a signal to the media device 12 in response to the beacon signal. The media device 12 then determines the signal strength of the signal received from the media device 12 to ascertain the distance to the mobile device 18 (or the location of the mobile device 18) from the media device 12.

The media device 12 automatically activates itself to play back the media content provided from the mobile device 18 in response to detecting that the mobile device 18 is within the location it previously stored. In general, the location of the mobile device 18 is tracked and stored by the media device 12. The media device 12 instructs the mobile device 18 to begin media play out to the media devices 12. All of the intelligence may be stored in the media devices 12.

Additionally, the mobile device 18 includes an accelerometer sensor 56 and a compass 60. The accelerometer sensor 56 provides acceleration data of the mobile device 18 in the x, y, z axis. The compass 60 provides current orientation or direction of the mobile device 18 relative to the North Pole.

The media device 12 continuously calculates and stores the user's proximity to the media device 12. The memory 50 in the media device 12 continuously updates data as stored therein that includes the distance of the mobile device 18 from the media device 12, orientation of the mobile device 18, and movement of the mobile device 18 as the user 16 moves throughout the zone where the media device 12 is located. In this way, the media device 12 learns the general boundaries of the zone over time and adapts by way of re-learning if the media device 12 is relocated.

The mobile device 18 transmits information corresponding to the acceleration data, and the current orientation direction of the mobile device 18 (e.g., parameters) to the media device 12. The memory 50 in the media device 12 continuously updates the data as stored therein that includes the distance of the mobile device 18 from the media device 12, orientation of the mobile device 18, and movement of the mobile device 18 as the user 16 moves throughout the zone where the media device 12 is located. Each media device 12 builds a wireless fingerprint for each room 14 (or media zone) based on the information collected from one another and from the mobile device 18. The media device 12a may use the acceleration data and the orientation data provided by the mobile device 18 to anticipate when the mobile device 18 transitions from one media zone into another media zone that includes a different media device 12.

It is recognized that the media device 12 may also include an infrared (IR) detector 70 to aid in detecting when the user 16 is in the room 14. If the user 16 is detected to be in the room 14 and the mobile device 18 is detected to within distance (or location) of the media device 12, the media device 12 may activate itself for playback and transmit a signal to the mobile device 18 to initiate playback of the media content. Additionally, the media device 12 may also include an altimeter 72 to aid in the elevation detection of another media device 12.

As exhibited above, the media device 12 is configured to automatically activate itself (without user intervention) upon detecting that the mobile device 18 is positioned proximate to the media device 12. If the media device 12a recognizes that the mobile device 18 is closer to another media device 12n (i.e., is positioned in another media zone), then the media device 12a may deactivate itself while the media device 12n activates itself to being playback. This may occur without user intervention.

While noted above that each of media device 12 and the mobile device 18 transmits and receives location information to one another for building a wireless fingerprint for each room 14, it is recognized that only the various media devices 12 may simply build a wireless fingerprint for each room 14. In this case, the corresponding media device 12 that detects the mobile device 18 is positioned proximate to the media device 12, may transmit a control signal to the mobile device 18 to initiate media playback. As the user 16 moves through various rooms 14, the media device 12a that is active may deactivate itself as such a media device 12a that the mobile device 18 is no longer proximate thereto and the media device 12n that is now proximate to the mobile device 18 may transmit the control signal to the mobile device 18 to continue media playback with the media device 12n.

Figure 8:
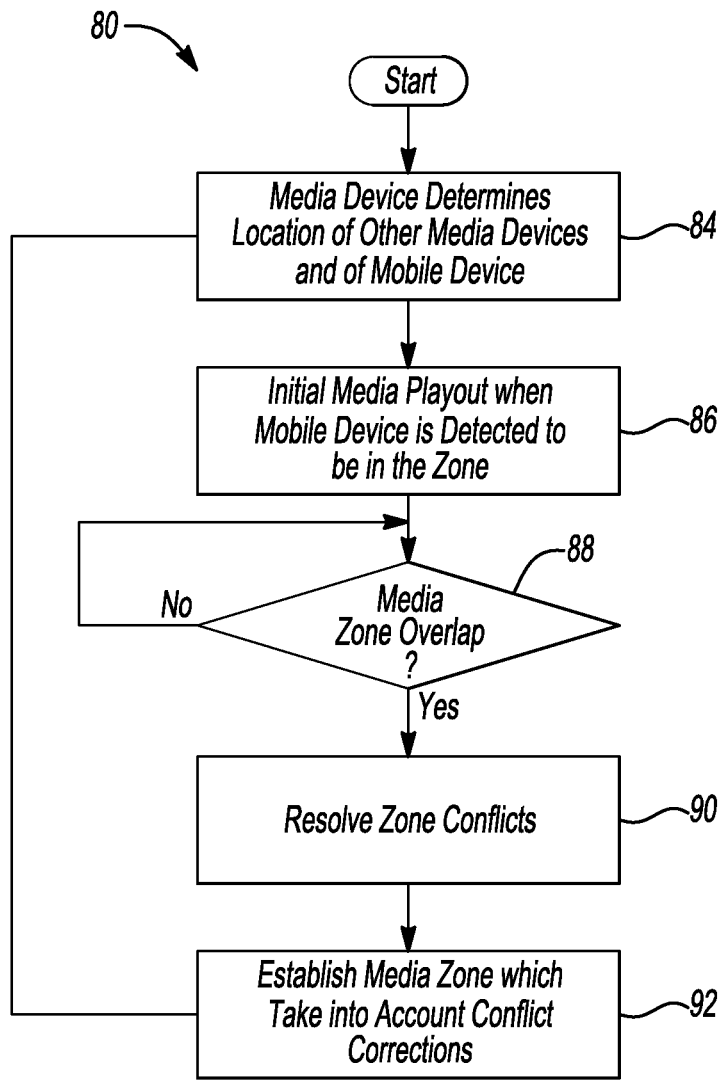
FIG. 8 depicts a method for detecting the media device and the mobile device to establish media zones in accordance to one embodiment.

FIG. 8 depicts a method 80 for detecting the media devices 12 and the mobile device 18 to establish media zones.

In operation 84, the media devices 12 may determine the location of other media devices 12 in various rooms 14 and also determine the location of the mobile device 18 as noted above. The memory 50 in the media device 12 continuously updates the data as stored therein that includes the distance of the mobile device 18 from the media device 12, orientation/direction of the mobile device 18, and movement of the mobile device 18 as the user 16 moves throughout the zone where the media device 12 is located. In this way, the media devices 12 learn the general boundaries of the zone over time and adapt by way of re-learning if the media device 12 is relocated. Each media device 12 builds a wireless fingerprint for each room 14 (or media zone) based on the information collected from one another and from the mobile device 18.

In operation 86, the media device 12 initiates media playback with the mobile device 18 to play back the media content when the user 16 is detected to be within the media zone. When the user 16 moves outside of the media zone, media play out will be suspended, paused, or played out locally on the mobile device 18 until the user 16 enters another media zone. Areas without active media zones are generally defined as "inactive zones" where no media play out occurs, or where the user 16 may choose to have the media play locally on the mobile device 18.

Consider the following example for the manner in which the media device 12 initiates media playback. If the media device 12a determines that media device 12n is positioned 10 ft. away based on the measured signal strength from the signal received from the media device 12n and the media device 12a determines that the mobile device 18 is positioned 2 ft. away, the media device 12a may activate itself to initiate playing back the media content as received from the mobile device 18. In this case, the mobile device 18 is positioned within the media zone that includes the media device 12a.

Conversely, if the media device 12a determines that the media device 12n is positioned 10 ft. away and the mobile device 18 is positioned 10 ft away, the media device 12a may not activate itself in this case. Each media device 12a and 12n may then monitor the acceleration data and/or direction data as provided by the mobile device 18 to determine whether the mobile device 18 is positioned in the media zone that includes the media device 12a or in the media zone that includes the media device 12n.

In operation 88, the media devices 12 each determine whether there is a media zone overlap. For example, the mobile device 18 transmits proximity data indicating there are two or more media devices 12 that are detected in a particular media zone, or are detected to be proximate to the mobile device 18. If this condition is true, then the method 80 moves to operation 90. If not, then the method 80 remains in operation 88 to continue with the media play out.

In operation 90, the media devices 12 deselect a default media device 12 to locate and select a correct media device 12. This may be achieved in one of two ways. In a first implementation, the user 16 may manually select the correct media device 12 that is to be assigned to a particular media zone via selection with a user interface on the mobile device 18 such that the LUT 20 is updated to reflect that the selected media device 12 will be used in the particular media zone. When an override is entered by the user 16, the user's location data is stored, so that the media devices 12 learn and automatically selects the correct media device 12 when the user 16 enters the media zone experiencing the zone overlap. The location data may include radio signal strength, and other suitable types of data to provide the location. In another example, a wireless "fingerprint" of the room 14 may be stored which includes all currently active Wi-Fi and Bluetooth® beacons, compass data, etc. Over time, the media zone overlap will be mapped and resolved in favor of the correct media device 12 without manual intervention. In this way, walls and other obstructions are implicitly mapped. It is recognized that the media devices 12 may also recognize when it is selected to be the device to playback the media content when a manual override is provided.

In a second implementation, the media devices 12 may utilize the technique as disclosed above (see FIG. 3) in which the media device 12 may be automatically selected without any intervention from the mobile device 18. For example, the media device 12 may transmit a control signal to the mobile device 18 instructing the mobile device 18 to command the media device 12 to transmit the predetermined audio signal which includes either the audible preamble or the stored inaudible signature (or watermark) to determine if there is a match with the stored data in the LUT 20 of the mobile device 18. If there is a match, then the media device 12 updates the memory 50 such that the matched media device 12 is identified as the correct media device 12 for the media zone which exhibits the overlap condition. If a match is not found, the media device 12 transmits a command to the next media device 12 which is detected in the overlapped media zone (or the next media device 12 that has the highest signal strength).

In operation 92, the media devices 12 establish the media zone with the selected media device 12 as entered via user input or with the matched media device 12 as automatically determined by virtue of the media device 12 including the matched audible preamble or the stored inaudible signature. For example, the media device 12 in room 14a (i.e., a first room), and the media device in room 14b (i.e., a second room) each store correct zone mapping data independently. The zone mapping data may include wireless fingerprints of any Wi-Fi or Bluetooth® beacons, dead reckoning data from a compass and accelerometers in addition to other types of sensors such as infrared and ultrasonic.

Figure 9:
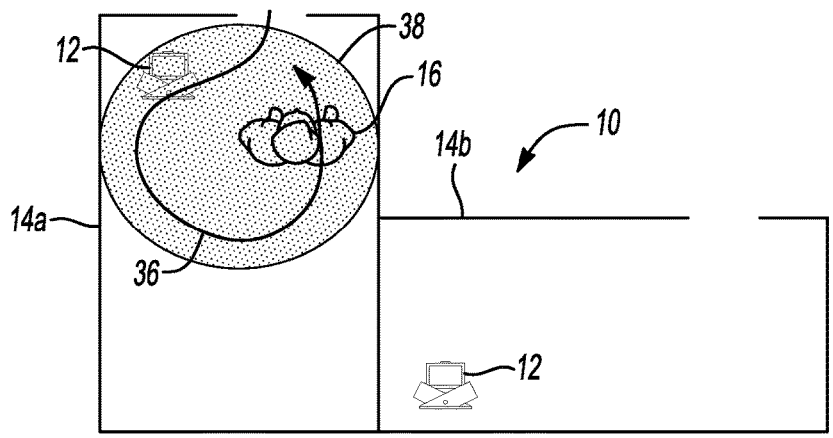
FIGS. 9-13 depict a progression of the media zone mapping in accordance to one embodiment.
Figure 10:
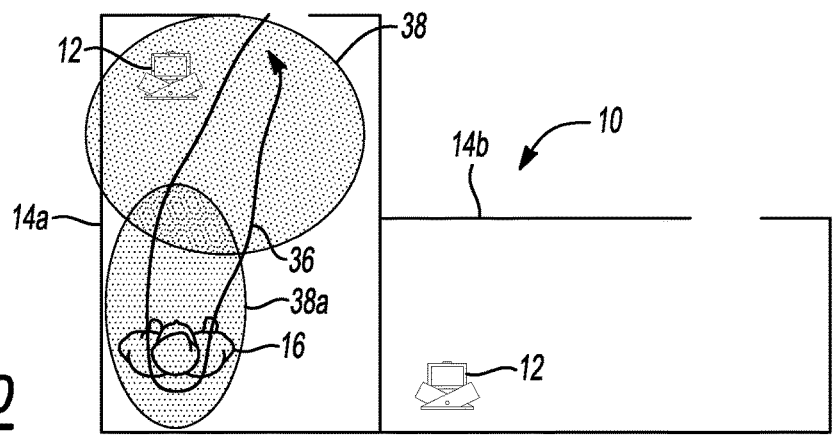
Figure 11:
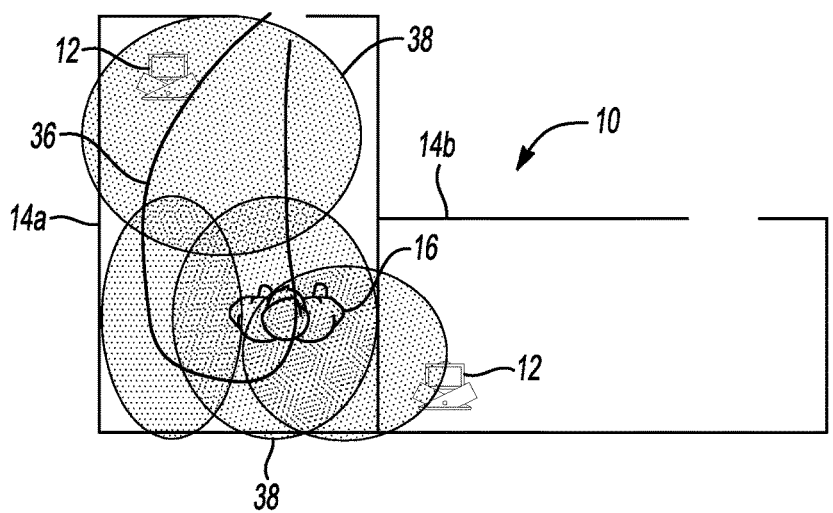

FIG. 9 depicts the condition in which the user 16 enters the room 14a for the first time after installing the media device 12. FIG. 10 depicts an increase in the media zone (see region 38a). FIG. 11 depicts an occurrence of a potential media zone conflict between the media device 12 positioned in the room 14a and the media device 12 positioned in the room 14b. The overlap occurs if the signal strength of the media device 12 as positioned in the room 14b is equal to or greater than the signal strength of the media device 12 positioned in the room 14a.

Figure 12:
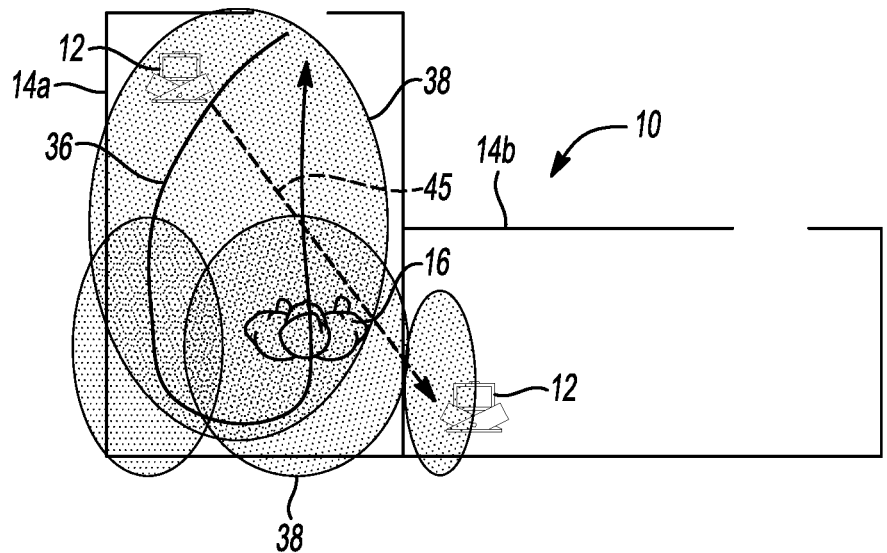

FIG. 12 depicts the media zone overlap between the media device 12 positioned in the room 14a and the media device 12 positioned in the room 14b has been resolved. As noted above, resolution of the overlapped media zone may be executed in connection with operation 90 as noted above in connection with FIG. 8. As also noted above, each of the media device 12 and the mobile device 18 includes a transceiver for wirelessly transmitting and receiving information to and from one another. The media devices 12 in each room 14 establishes a mesh network 45 between one another such that each media device 12 stores the location data which identifies the correct media zone for each media device 12.

Figure 13:
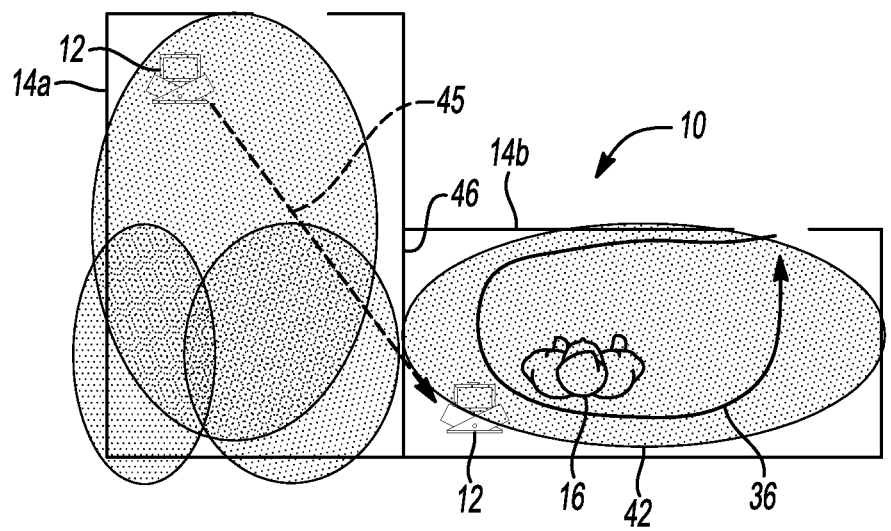

FIG. 13 depicts the generation of a new media zone (see region 42) in the room 14b as the user 16 has entered and navigated that space. A new conflict is not created in this case because of the distance between the media device 12 in the room 14a and the mobile device 18 (on the user 16) in the room 14b, and because the presence of a wall 46 causes the signal strength of the mobile device 18 to be higher at the media device 12 positioned in the room 14b than that of the media device 12 positioned in the room 14a.

The present disclosure generally determines which media device 12 is the right one to playback media based on (i) proximity (e.g., radio signal strength measurements), (ii) fingerprints (e.g., the location has a wireless signature that has been seen before by the media device 12), and/or (iii) the successful selection of the media device 12 as determined by the device hearing the watermark or preamble, or (iv) the user 16 manually overriding the system. All these of these aspects together, when mapped and learned over time, constitute a media zone. In this sense, a media zone is a logical construct rather than a 1:1 mapping with a room. In some cases, there will be a 1:1 correspondence between a media zone and the physical room, but there doesn't have to be. This is illustrated by FIG. 9-13. In FIG. 9, the media zone is small and only encompasses about half of the room. In FIG. 10, the media zone is a bit larger, but still not equal to the room dimensions. In FIG. 11, the media zone is now encompassing the whole room, and part of the adjacent room. Once the conflict is resolved (automatically or manually), the implementation learns the true dimensions of the zone as in FIG. 13. However, imagine a case where the two rooms are only separated by a door-sized opening in the wall, and there is only a single media device 12. In that case, the implementation could create a media zone that encompasses either rooms or even only part of the adjacent room. In effect, over time the implementation will (i) determine which device is closest to the mobile device, (ii) determine what the fingerprint looks like and whether it has been seen before, (iii) attempt to play to the device, and (iv) determine whether the preamble was heard and if true, add this to the zone information. These operations are repeated iteratively and over time and the zone forms automatically.

Figure 14:
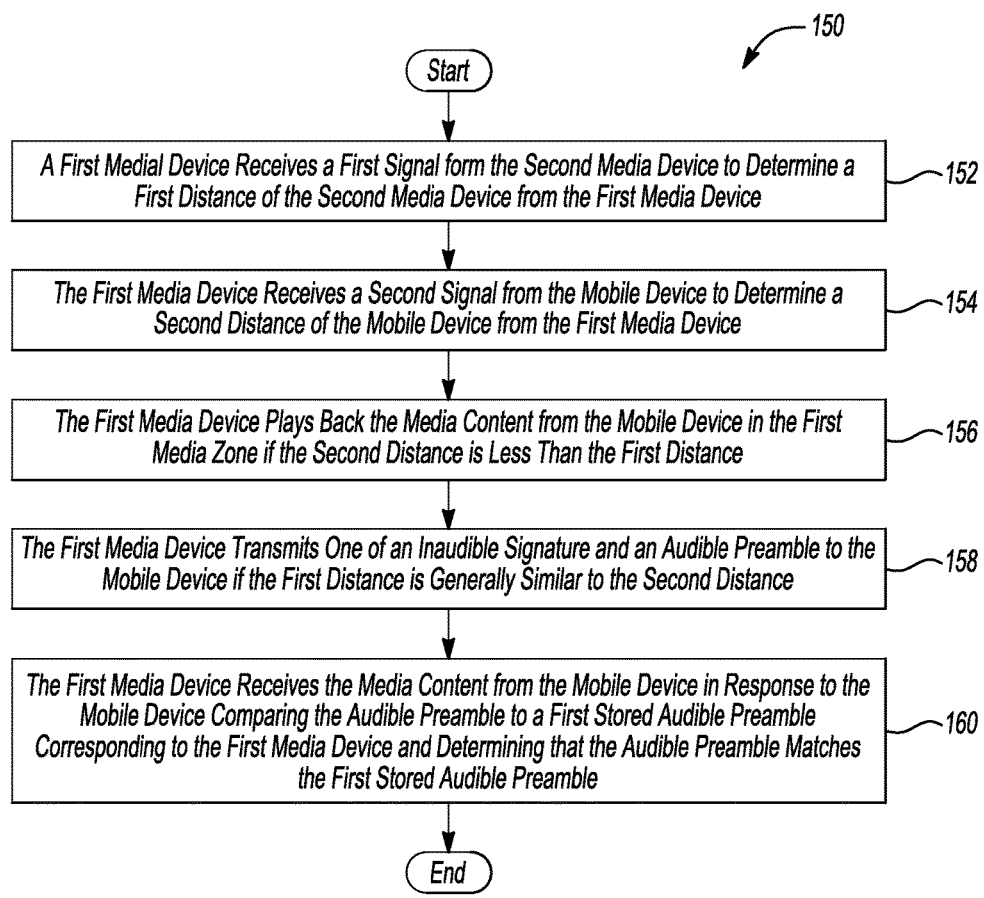
FIG. 14 depicts a method as executed by an apparatus for automatic device selection and for media content playback in accordance to one embodiment.

FIG. 14 depicts a method 150 as executed by an apparatus for automatic device selection and for media content playback in accordance to one embodiment.

In operation 152, the first media device 12a receives a first signal from a second media device 12b to determine a first distance of the second media device 12b from the first media device 12a.

In operation 154, the first media device 12a receives a second signal from the mobile device 18 to determine a second distance of the mobile device 18 from the first media device 12a.

In operation 156, the first media device 12a plays back the media content from the mobile device 18 in the first media zone if the second distance is less than the first distance.

In operation 158, the first media device 12a transmits one of an inaudible signature and an audible preamble to the mobile device 18 if the first distance is equal to the second distance.

In operation 160, the first media device 12a receives the media content from the mobile device 18 in response to the mobile device 18 comparing the audible preamble to a first stored audible preamble corresponding to the first media device 12 and determining that the audible preamble matches the first stored audible preamble.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for automatic device selection and for media content playback, the apparatus comprising:
a first media device for being positioned in a first media zone and for being wirelessly coupled to a second media device that is positioned in a second media zone and to a mobile device that transmits media content, the first media device being configured to:
receive a first signal from the second media device to determine a first distance of the second media device from the first media device based on a measured signal strength of the first signal;
receive a second signal from the mobile device to determine a second distance of the mobile device from the first media device based on a measured signal strength of the second signal;
playback the media content from the mobile device in the first media zone if the second distance is less than the first distance;
transmit one of a first inaudible signature and a first audible
preamble to the mobile device if the first distance is equal to the second distance; and
receive the media content from the mobile device in response to the mobile device comparing the first audible preamble to a first stored audible preamble corresponding to the first media device and determining that the first audible preamble matches the first stored audible preamble, wherein the first media zone and the second media zone at least partially overlap one another.

2. The apparatus of claim 1 wherein the first media device forms a mesh network with the second media device and the mobile device.

3. The apparatus of claim 1 wherein the mobile device is configured to compare the first inaudible signature to a first stored inaudible signature corresponding to the first media device and to transmit the media content to the first media device for playback if the first inaudible signature matches the first stored inaudible signature.

4. The apparatus of claim 3 wherein the mobile device is further configured:
receive a second inaudible signature from a second media device; and
compare the second inaudible signature to a second stored inaudible signature corresponding to the second media device and to transmit the media content to the second media device for playback if the second inaudible signature matches the second stored inaudible signature.

5. The apparatus of claim 1 wherein the mobile device is further configured to:
receive a second audible preamble from a second media device; and
compare the second audible preamble to a second stored audible preamble corresponding to the second media device and to transmit the media content to the second media device for playback if the second audible preamble matches the second stored audible preamble.

6. The apparatus of claim 1 wherein the second signal includes one or more of acceleration data of the mobile device, orientation data of the mobile device, and global position system (GPS) coordinates of the mobile device.

7. The apparatus of claim 1 wherein the first media device is a loudspeaker and the mobile device comprises one of a cellphone, tablet, and laptop computer.

8. A method for automatic device selection and for media content playback, the method comprising:
wirelessly coupling a first media device that is in a first media zone to a second media device that is in a second media zone and to a mobile device that transmits media content;
determining a first distance between the first media device and the second media device in response to a first signal as transmitted from the second media device;
determining a second distance between the first media device and the mobile device in response to a second signal as transmitted from the mobile device;
selecting the first media device to playback the media content from the mobile device if the second distance is less than the first distance;
transmitting one of an audible preamble and an inaudible signature to the mobile device if the first distance is equal to the second distance is equal; and
receiving the media content from the mobile device in response to the mobile device comparing the audible preamble to a first stored audible preamble corresponding to the first media device and determining that the audible preamble matches the first stored audible preamble,
wherein the first media zone and the second media zone at least partially overlap one another,
wherein determining the first distance is based on a measured signal strength of the first signal, and
wherein determining the second distance is based on a measured signal strength of the second signal.

9. The method of claim 8 further comprising receiving the media content from the mobile device in response to the mobile device comparing the inaudible signature to a first stored inaudible signature corresponding to the first media device and determining that the inaudible signature matches the first stored inaudible signature.

10. An apparatus for automatic device selection and for media content playback, the apparatus comprising:
a mobile device for being wirelessly coupled to a first media device in a first media zone that (i) receives a first signal from a second media device in a second media zone to determine a first distance between the first media device and the second media device based on a measured signal strength of the first signal, and (ii) receives a second signal to determine a second distance between the mobile device and the first media device based on a measured signal strength of the second signal, the mobile device being configured to:
transmit the second signal to the first media device;
transmit media content for playback on the first media device if the first distance is greater than the second distance;
receive one of a first audible preamble and a first inaudible signature from the first media device if the first distance is equal to second distance; and
compare the first audible preamble to a first stored audible preamble corresponding to the first media device; and
transmit the media content to the first media device for playback if the first audible preamble matches the first stored audible preamble,
wherein the first media zone and the second media zone at least partially overlap one another.

11. The apparatus of claim 10 wherein the mobile device is further configured to:
receive a second audible preamble from a second media device; and
compare the second audible preamble to a second stored audible preamble corresponding to the second media device and to transmit the media content to the second media device for playback if the second audible preamble matches the second stored audible preamble.

12. The apparatus of claim 10 wherein the second signal includes one or more of acceleration data of the mobile device, orientation data of the mobile device, and global position system (GPS) coordinates of the mobile device.

13. The apparatus of claim 1 wherein the first media device is further configured to transmit the first audible preamble to a microphone of the mobile device if the first distance is equal to the second distance.

14. The method of claim 8 wherein transmitting the one of the audible preamble and the inaudible signature to the mobile device if the first distance and the second distance is equal to one another first media device further includes transmitting the one of the audible preamble to a microphone of the mobile device if the first distance is generally similar to the second distance.

15. The apparatus of claim 10 wherein the mobile device includes a microphone to receive the first audible preamble.

* * * * *